United States Patent
Meyer

(10) Patent No.: US 11,762,929 B1
(45) Date of Patent: Sep. 19, 2023

(54) INTENT IDENTIFICATION USING ONLINE PAGE

(71) Applicant: Zoom Video Communications, Inc., San Jose, CA (US)

(72) Inventor: Randall Louis Meyer, Metairie, LA (US)

(73) Assignee: Zoom Video Communications, Inc., San Jose, CA (US)

(*) Notice: Subject to any disclaimer, the term of this patent is extended or adjusted under 35 U.S.C. 154(b) by 0 days.

(21) Appl. No.: 17/978,105

(22) Filed: Oct. 31, 2022

(51) Int. Cl.
```
G06F 7/02        (2006.01)
G06F 16/00       (2019.01)
G06F 16/9535     (2019.01)
G06F 40/30       (2020.01)
G06F 40/205      (2020.01)
G06F 16/951      (2019.01)
G06F 40/134      (2020.01)
G06F 16/955      (2019.01)
G06F 40/143      (2020.01)
```

(52) U.S. Cl.
CPC ........ *G06F 16/9535* (2019.01); *G06F 16/951* (2019.01); *G06F 16/9558* (2019.01); *G06F 40/134* (2020.01); *G06F 40/143* (2020.01); *G06F 40/205* (2020.01); *G06F 40/30* (2020.01)

(58) Field of Classification Search
CPC ............ G06F 16/9535; G06F 16/9558; G06F 16/951; G06F 40/134; G06F 40/205; G06F 40/143; G06F 40/30
See application file for complete search history.

(56) References Cited

U.S. PATENT DOCUMENTS

| 11,113,476 B2 | 9/2021 | Seibel | |
| 2016/0189263 A1* | 6/2016 | Junge | G06Q 30/0613 705/26.41 |
| 2020/0294071 A1* | 9/2020 | Christensen | G06F 16/24578 |
| 2022/0414341 A1* | 12/2022 | Zotto | G06F 40/35 |

OTHER PUBLICATIONS

Wikipedia, Word embedding, https://en.wikipedia.org/w/index.php?title=Word_embedding&oldid=1106009992, Aug. 22, 2022, 7 pages.
Published in Analytics Vidhya, Machine learning-based intent classification model, Shivansh Dave, Jun. 8, 2020, 7 pages.
Cloudflare, What is robots.txt? How a robots.txt file works, https://www.cloudflare.com/learning/bots/what-is-robots-txt/, Oct. 2022, 10 pages.

* cited by examiner

*Primary Examiner* — Bruce M Moser
(74) *Attorney, Agent, or Firm* — Young Basile Hanlon & MacFarlane, P.C.

(57) ABSTRACT

A server identifies, by parsing through code of an online page, information related to offerings associated with the online page. The server identifies a set of intents based on the information. At least a portion of the set of intents corresponds to headers or menu items of the online page. The server updates the set of intents based on supplemental information accessible by a hyperlink from the online page. The server transmits the updated set of intents to a first user device. The server receives an acceptance of a subset of the updated set of intents from the first user device. The server stores, in an intent data repository, the accepted subset of the updated set of intents. The intent data repository stores intents to which queries are to be matched. The queries are received during a contact center engagement between an end-user and a computer-implemented agent.

20 Claims, 9 Drawing Sheets

INTENT IDENTIFICATION USING ONLINE PAGE

FIELD

This disclosure relates to techniques for intent identification using an online page, for example, by parsing code of the online page.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
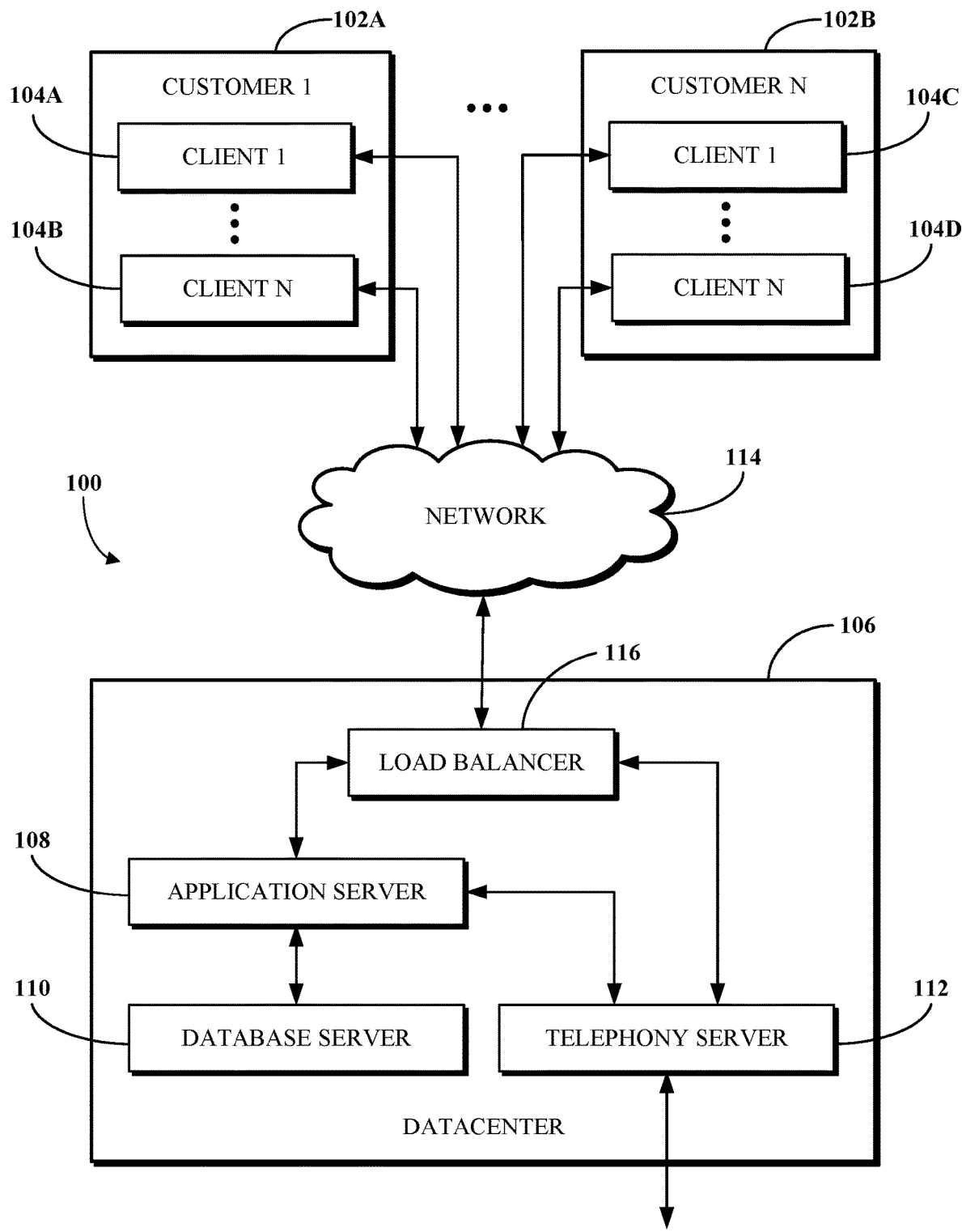
FIG. 1 is a block diagram of an example of an electronic computing and communications system.

Contact centers may attempt to streamline and automate processing of end-user queries. An end-user query may include spoken or typed information representing why the end-user is accessing the contact center. For example, an end-user may be prompted to speak or type the reason why they are accessing the contact center, and the end-user's response to the prompt may be the query. To automate processing of user queries, an entity (e.g., an online store, a bank, or a restaurant) that uses a contact center may identify a set of intents (i.e., generate a set of intents with which end-users typically access the contact center). Intents include representations of user goals in accessing the contact center which may be processed using a common processing technique. For example, a set of intents for an online shopping service may include purchase product, return product, and replace product. Multiple different queries may be associated with a single intent, and then processed using a processing technique for the intent. For example, all queries (e.g., "I want to buy the product," or "order product") associated with the "purchase product" intent may be processed in a similar way, for example, by using an automated chatbot interface, by routing to an appropriate human agent, or by providing a link to a webpage from which the product may be purchased. When an end-user query is received, the end-user query is mapped to an intent, and then the processing of the end-user query is streamlined based on the intent. In some cases, an employee of an entity using a contact center may manually generate a set of intents for the contact center. However, the employee may inadvertently fail to manually identify some intents, as there may be hundreds or thousands of different intents for which processing could potentially be streamlined. Thus, automatic generation of intents for the entity using the contact center may be desirable. The automatic generation of intents may be accompanied by manual review of the generated intents.

Implementations of this disclosure address problems such as these by using an intent identification engine that executes on a computing device, such as a server, to identify a set of intents that may be matched to end-user queries. The automated intent identification engine accesses a page (e.g., a webpage, an electronic document listing functionalities, or a scan of a physical document to which optical character recognition was applied) associated with the entity for which the contact center is operated. The intent identification engine identifies a menu or a set of headers on the page. For example, a webpage of a bank may have a menu with the following items: "checking," "credit cards," "mortgage," and "banking blog." Alternatively, these may be headers of different parts of the webpage. These items may be added to a set of intents identified by the intent identification engine. In the above example, the identified set of intents can include intents for "checking," "credit cards," and "mortgage." The intent identification engine may access sub-headers or sub-menu items of the above-listed items. For example, the menu item or header "mortgage" may have the sub-headers or sub-menu items "fixed rate mortgage" and "adjustable rate mortgage." These may correspond to sub-intents of the intent "mortgage."

In some cases, the menu items or headers may link to other pages. Those other pages could include content that is be added to the set of intents by processing the other pages in a manner similar to the processing of the page above. For example, when "credit cards" is selected, another page may be opened that includes headers for "rewards cards," "cash back cards," and "low interest cards." These may correspond to sub-intents of the intent "credit cards." Additional intents may be added to the set of intents based on an industry or a category associated with the entity. For example, if other banks have the intent "check account balance," the intent "check account balance" could be added to the set of intents for the bank described above, even if the webpage of the bank lacks a "check account balance" header or menu item.

After the set of intents is generated, the set of intents may be proposed to an administrator of the entity for which the contact center is operated, such as by data indicative of the set of intents being transmitted to a device of the administrator of the entity. The administrator of the entity may then accept, decline, or propose a modification to the subset of the intents. For example, referring back to the banking example described above, an administrator of the bank may confirm that "checking," "credit cards," and "mortgage" correspond to intents, while "banking blog" does not. The administrator (or another administrator) may, upon an acceptance of a set of intents, provide a workflow for at least one of the accepted intents. For example, the intent "checking" may correspond to a workflow of providing information about available checking accounts and an application form. Alternatively, upon accepting a single intent from the set of intents, the administrator may provide a workflow for that accepted single intent.

As used herein, the term "intent" may include a member of a set of stored intents, where multiple natural language queries may match to the same intent. The intent may correspond to predicted data, for example, a predicted goal, of a user entering the natural language query. The predicted data may be associated with the natural language query. For example, a credit card company may have intents including: "change billing address," "dispute a charge," "request credit limit increase," and "request interest rate reduction," each of which could have multiple different corresponding natural language queries.

To describe some implementations in greater detail, reference is first made to examples of hardware and software structures used to implement a system for intent matching. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a unified communications as a service (UCaaS) platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
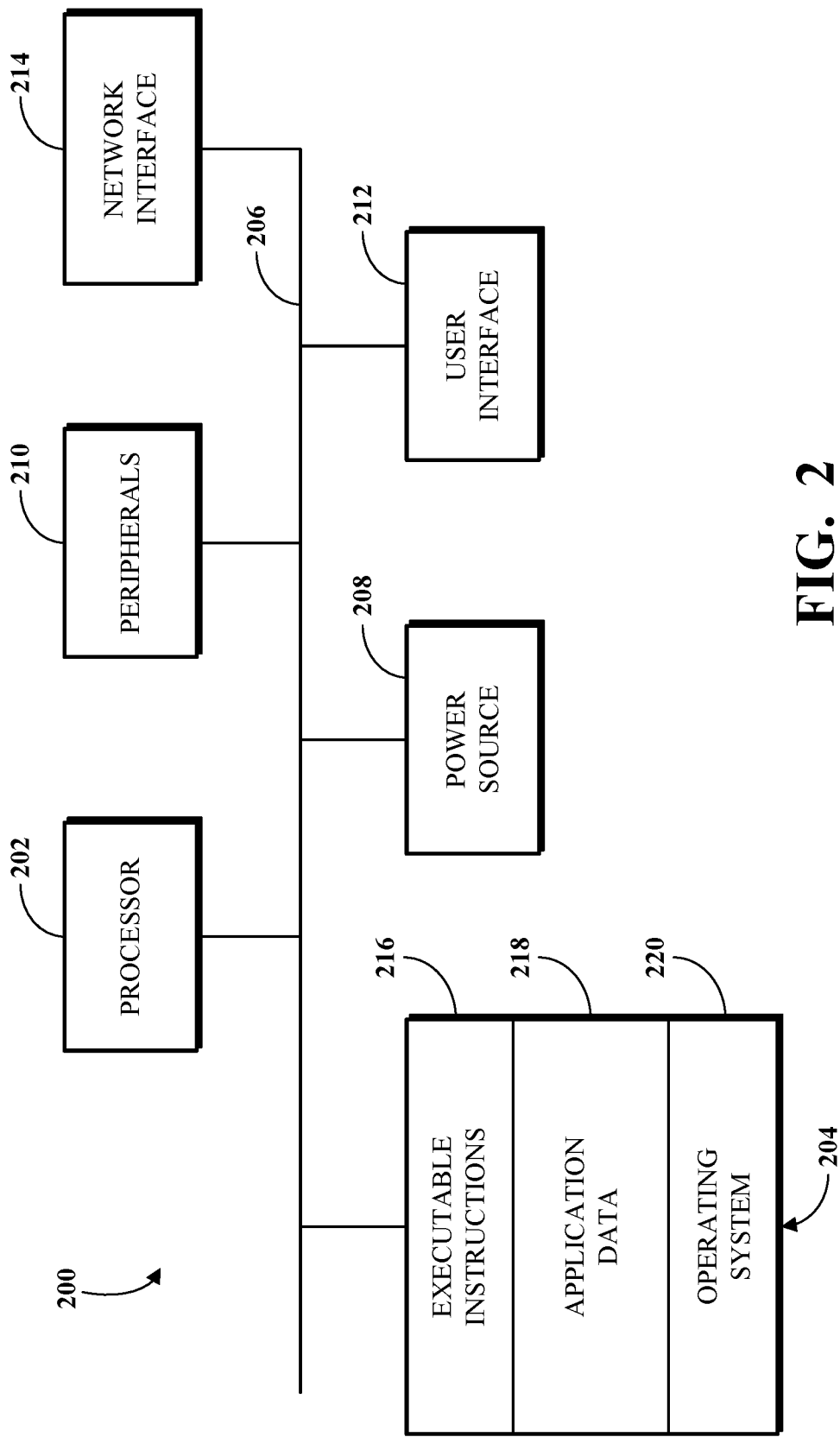
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
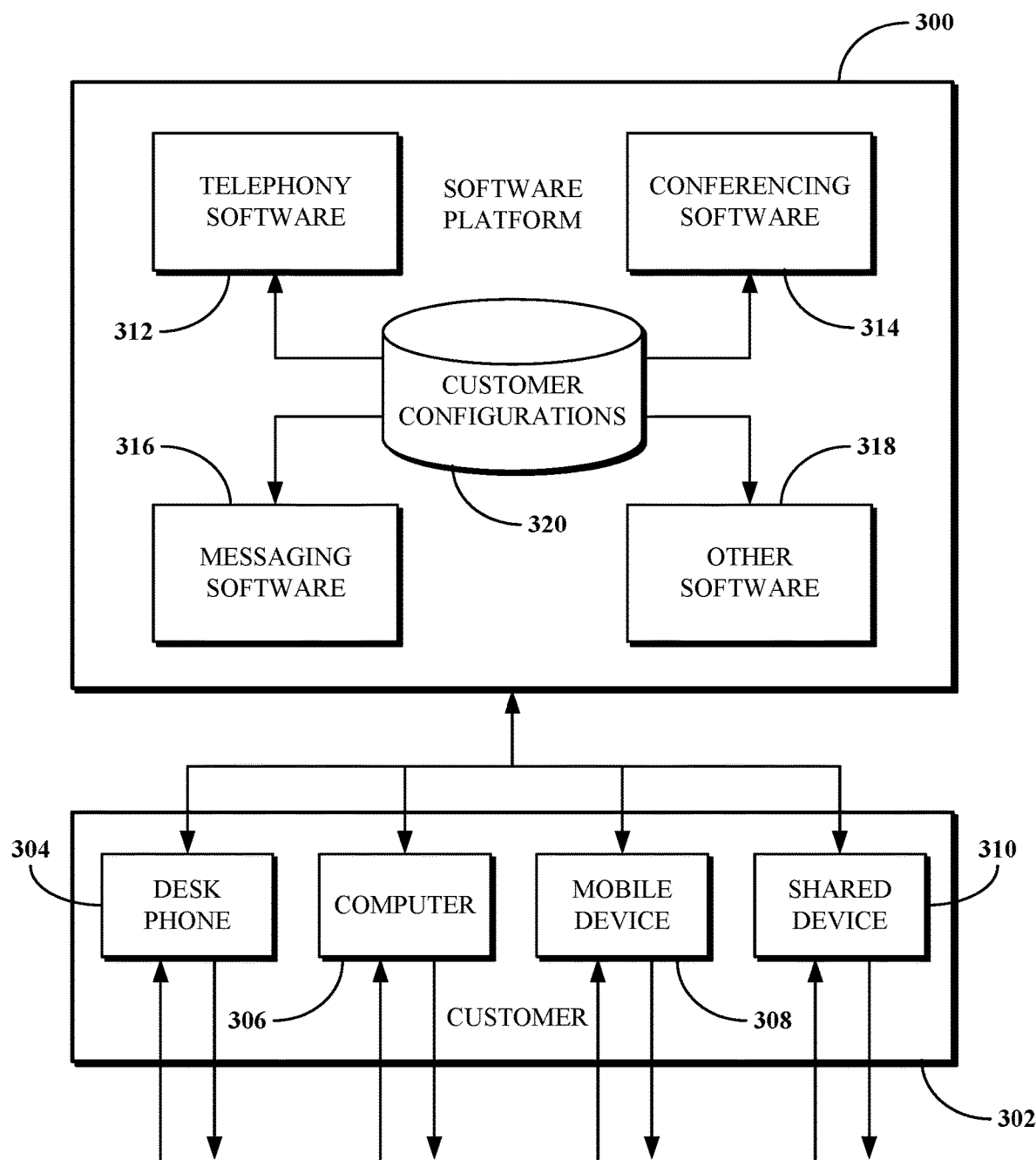
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include software for intent identification and/or software for matching a query to an intent.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
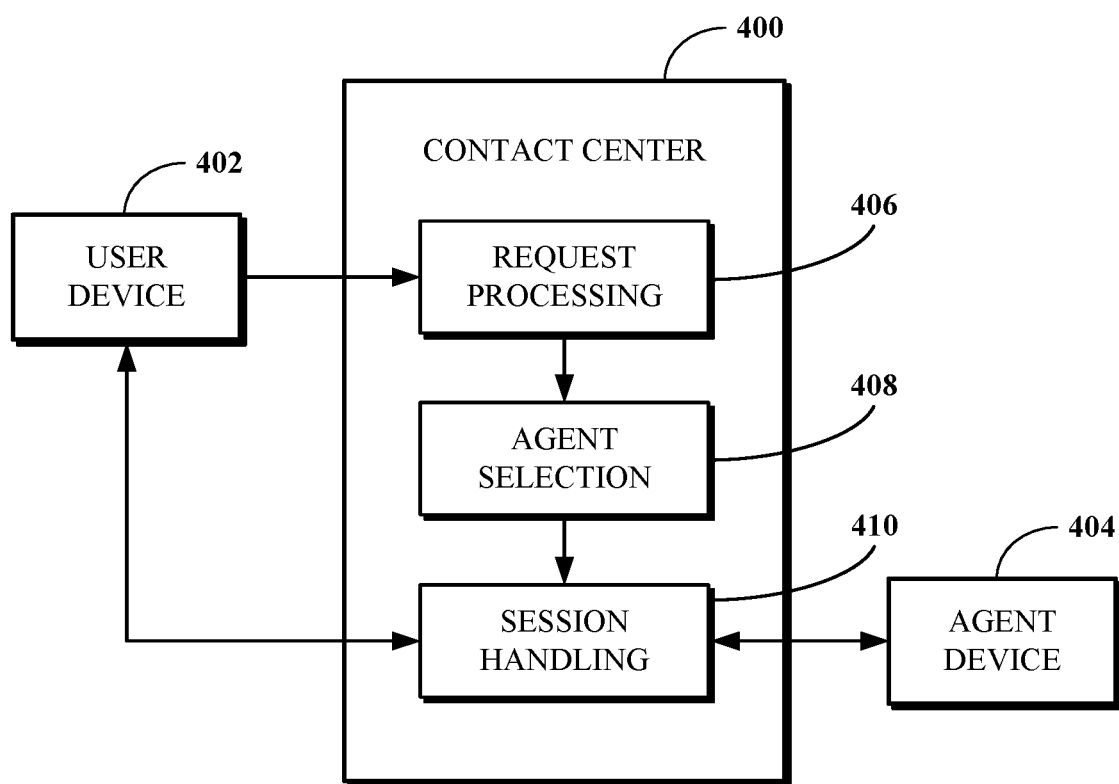
FIG. 4 is a block diagram of an example of a contact center system.

FIG. 4 is a block diagram of an example of a contact center system. A contact center 400, which in some cases may be implemented in connection with a software platform (e.g., the software platform 300 shown in FIG. 3), is accessed by a user device 402 and used to establish a connection between the user device 402 and an agent device 404 over one of multiple modalities available for use with the contact center 400, for example, telephony, video, text messaging, chat, and social media. The contact center 400 is implemented using one or more servers and software running thereon. For example, the contact center 400 may be implemented using one or more of the servers 108 through 112 shown in FIG. 1, and may use communication software such as or similar to the software 312 through 318 shown in FIG. 3. The contact center 400 includes software for facilitating contact center engagements requested by user devices such as the user device 402. As shown, the software includes request processing software 406, agent selection software 408, and session handling software 410.

The request processing software 406 processes a request for a contact center engagement initiated by the user device 402 to determine information associated with the request. The request may include a natural language query or a request entered in another manner (e.g., "press 1 to pay a bill, press 2 to request service"). The information associated with the request generally includes information identifying the purpose of the request and which is usable to direct the request traffic to a contact center agent capable of addressing the request. The information associated with the request may include information obtained from a user of the user device 402 after the request is initiated. For example, for the telephony modality, the request processing software 406 may use an interactive voice response (IVR) menu to prompt the user of the user device to present information associated with the purpose of the request, such as by identifying a category or sub-category of support requested. In another example, for the video modality, the request processing software 406 may use a form or other interactive user interface to prompt a user of the user device 402 to select options which correspond to the purpose of the request. In yet another example, for the chat modality, the request processing software 406 may ask the user of the user device 402 to summarize the purpose of the request (e.g., the natural language query) via text and thereafter process the text entered by the user device 402 using natural language processing and/or other processing.

The session handling software 410 establishes a connection between the user device 402 and the agent device 404, which is the device of the agent selected by the agent selection software 408. The particular manner of the connection and the process for establishing same may be based on the modality used for the contact center engagement requested by the user device 402. The contact center engagement is then facilitated over the established connection. For example, facilitating the contact center engagement over the established connection can include enabling the user of the user device 402 and the selected agent associated with the agent device 404 to engage in a discussion over the subject modality to address the purpose of the request from the user device 402. The facilitation of the contact center engagement over the established connection can use communication software implemented in connection with a software platform, for example, one of the software 312 through 318, or like software.

The user device 402 is a device configured to initiate a request for a contact center engagement which may be obtained and processed using the request processing software 406. In some cases, the user device 402 may be a client device, for example, one of the clients 304 through 310 shown in FIG. 3. For example, the user device 402 may use a client application running thereat to initiate the request for the contact center engagement. In another example, the connection between the user device 402 and the agent device 404 may be established using software available to a client application running at the user device 402. Alternatively, in some cases, the user device 402 may be other than a client device.

The agent device 404 is a device configured for use by a contact center agent. Where the contact center agent is a human, the agent device 404 is a device having a user interface. In some such cases, the agent device 404 may be a client device, for example, one of the clients 304 through 310, or a non-client device. In some such cases, the agent device 404 may be a server which implements software usable by one or more contact center agents to address contact center engagements requested by contact center users. Where the contact center agent is a non-human, the agent device 404 is a device that may or may not have a user interface. For example, in some such cases, the agent device 404 may be a server which implements software of or otherwise usable in connection with the contact center 400.

Although the request processing software 406, the agent selection software 408, and the session handling software 410 are shown as separate software components, in some implementations, some or all of the request processing software 406, the agent selection software 408, and the session handling software 410 may be combined. For example, the contact center 400 may be or include a single software component which performs the functionality of all of the request processing software 406, the agent selection software 408, and the session handling software 410. In some implementations, one or more of the request processing software 406, the agent selection software 408, or the session handling software 410 may be comprised of multiple software components. In some implementations, the contact center 400 may include software components other than the request processing software 406, the agent selection software 408, and the session handling software 410, such as in addition to or in place of one or more of the request processing software 406, the agent selection software 408, and the session handling software 410.

Figure 5:
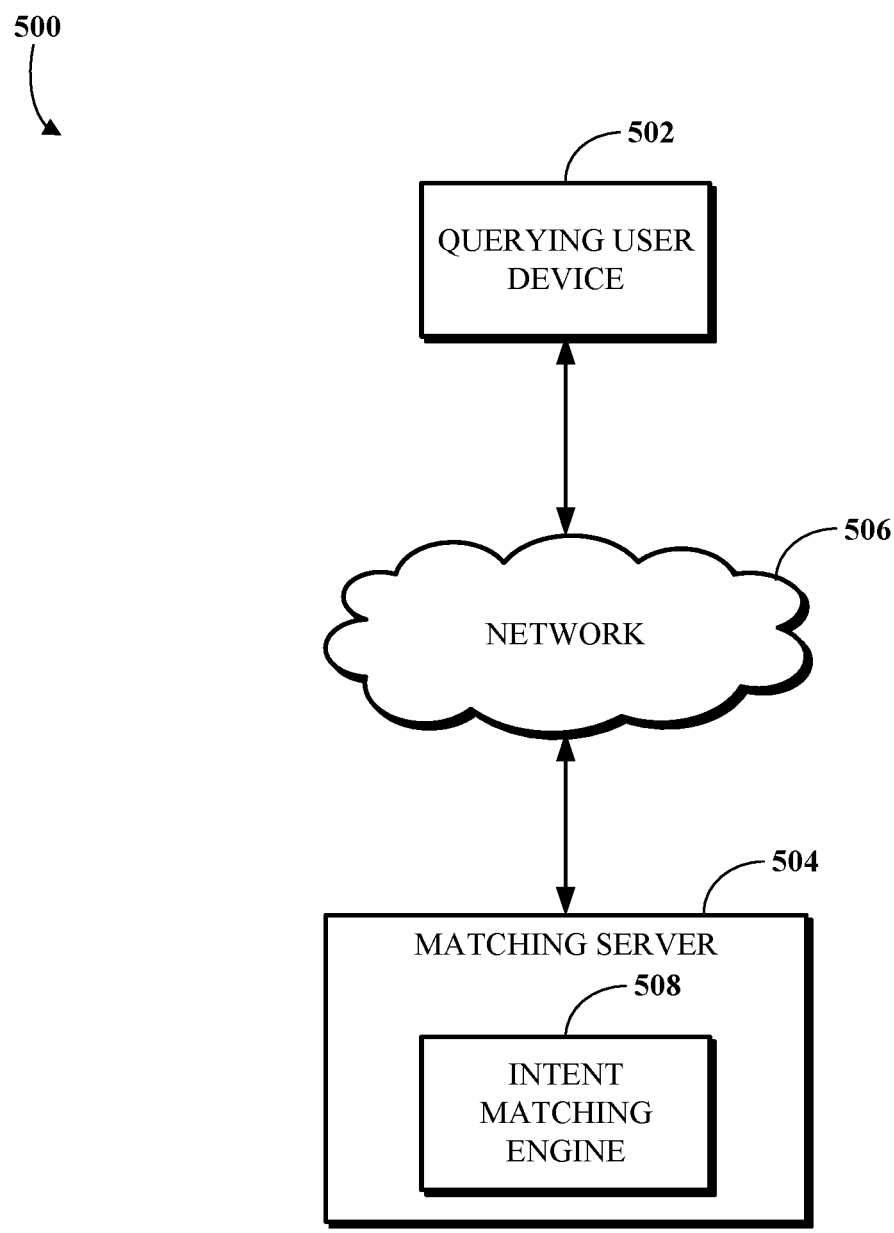
FIG. 5 is a block diagram of an example of a system in which intent matching may be performed.

FIG. 5 is a block diagram of an example of a system 500 in which intent matching may be performed. As shown, the system 500 includes a querying user device 502 and a matching server 504 capable of communicating over a network 506. The matching server 504 stores an intent matching engine 508 that matches an input natural language query to an intent. The intent matching engine 508 may be implemented using machine learning or other artificial intelligence technologies. In some examples, the intent matching engine 508 leverages a convolutional neural network (CNN). Alternatively, any other type of artificial neural network (ANN) may be used. In some cases, the intent matching engine 508 may be implemented using at least one of a classification model, a regression model, clustering, dimensionality reduction, or deep learning. More details of the operation of the intent matching engine 508 are provided below. As used herein, an engine may include software, hardware, or a combination of software and hardware.

The querying user device 502 may correspond to the user device 402 and/or to one of the clients 104A-D. The server 504 may correspond to a server of the contact center 400 and/or to the application server 108.

According to some implementations, the querying user device 502 transmits a natural language query (i.e., a query in a natural language, such as English, Spanish, French, German, Chinese, or Japanese) to the server 504 over the network 506. The natural language query may be spoken, typed, or otherwise inputted into the querying user device 502 in a natural language (e.g., of the multiple natural languages). The natural language query may include a question or a request provided to a chat bot, for example, "How do I cancel my subscription?" or "I would like to cancel my subscription."

In response to receipt of the query from the querying user device 502, the server 504 uses the intent matching engine 510 to match the query to an intent, and transmits, to the querying user device 502, an output associated with the intent. An intent may represent a goal or a purpose that a user of the querying user device is attempting to accomplish. For example, the query, "I would like to cancel my subscription," may match to the intent, "cancel subscription."

Figure 6:
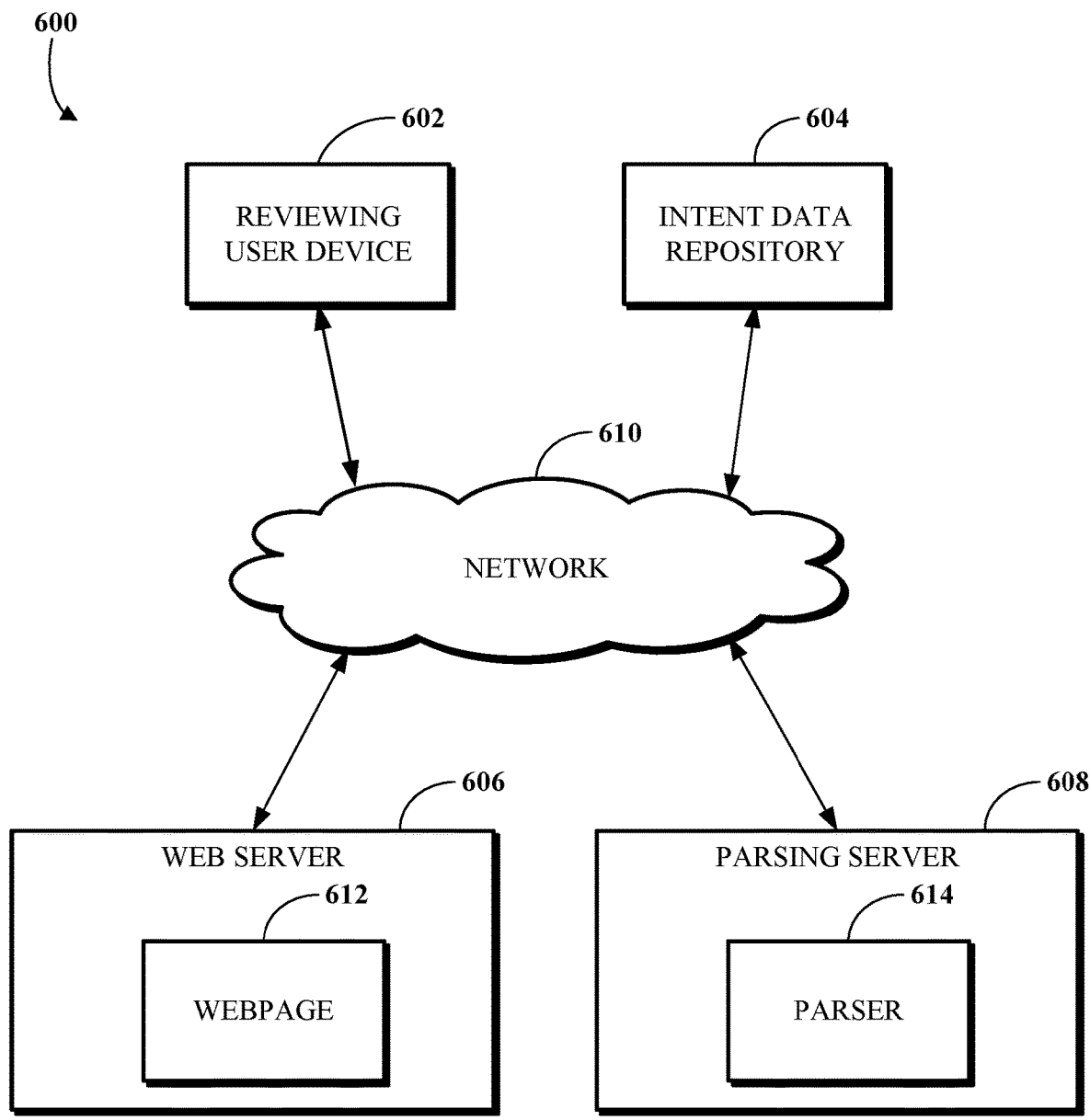
FIG. 6 is a block diagram of an example of a system in which intent identification may be performed.

FIG. 6 is a block diagram of an example of a system 600 in which intent identification may be performed. As shown, the system 600 includes a reviewing user device 602, an intent data repository 604, a web server 606, and a parsing server 608 capable of communicating with one another over a network 610. The web server 606 hosts a webpage 612. The parsing server 608 includes a parser 614.

The reviewing user device 602 may correspond to one of the clients 104A-D and may be operated by a user who will review proposed intents, for example, an information technology administrator or other administrator of an entity for which a contact center using the system 600 is operated. The intent data repository 604 may correspond to a database accessible via the database server 110 or another data storage unit. The intent data repository 604 may store a set of intents for the entity (e.g., a business) for which the contact center is operated. Intents may be added to the intent data repository 604 as described below. The web server 606 may, for example, be or otherwise correspond to the application server 108. The parsing server 608 may, for example, be or otherwise correspond to the application server 108 or the database server 110. The network 610 may, for example, be or otherwise correspond to the network 114 or the network 506. It should be noted that the implementation illustrated in FIG. 6 may be related to the implementation illustrated in FIG. 5, with the intent matching engine 508 of FIG. 5 matching a received natural language query to one of the intents stored in the intent data repository 604.

The webpage 612 hosted by the web server 606 may be a webpage of the entity. For example, if the entity is a restaurant, the webpage 612 may include information related to the restaurant's dining menu and/or business hours, and user interface icons for making a dining reservation, ordering delivery or ordering takeout. In another example, if the entity is a bank, the webpage 612 may include information related to consumer or business accounts offered by the bank.

The parser 614 parses the webpage 612 to identify intents for storage in the intent data repository 604 (after acceptance of the intents by the reviewing user device 602). The webpage 612 may be identified as corresponding to an entity that uses the contact center by an employee of the entity and/or an employee of the contact center. For example, when setting up service with the contact center, an administrator of the entity may be prompted to specify the webpage 612 of the entity. According to some implementations, the parser 614 identifies, by parsing through code of the webpage 612, information related to offerings associated with the entity. For example, for a restaurant, the offerings may include "dining menu," "dining reservation," "delivery," and "takeout." These may be presented within a menu of the webpage 612 The parser 614 identifies a set of intents based on the information. The set of intents may correspond to the menu items (of the menu of the webpage 612, as opposed to the dining menu of the restaurant). For example, the set of intents for the restaurant, identified based on the menu of the webpage 612, may include "dining menu," "dining reservation," "delivery," and "takeout." The set of intents may be updated based on supplemental information accessible by hyperlink from the webpage 612. For example, the "dining menu" item on the menu of the webpage 612 may be a hyperlink to another webpage that includes a sections titled: "breakfast menu," "lunch menu," and "dinner menu." In this case, "breakfast menu," "lunch menu," and "dinner menu" may correspond to sub-intents of the intent "dining menu."

The parser 614 identifies the headers and/or the menu items of the webpage 612 by reviewing the code of the webpage 612. Headers may be formatted differently (e.g., using larger text or bold text) from other text on the webpage 612, and the different formatting may be indicated in the code of the webpage 612. A menu may be encoded in a specific manner in a markup language, such as HTML, or another programming language used to encode the webpage 612. In reviewing the code of the webpage 612, the parser 614 accesses a bot instruction file (e.g., robots.txt) for the webpage 612 and accesses the sections of the page that are identified, in the bot instruction file, as permissible for automated access.

After the set of intents is generated by the parser 614, the parsing server 608 transmits (e.g., via email or via a push notification in a dedicated application) the set of intents to the reviewing user device 602. A user of the reviewing user device 602 accepts a subset of the set of intents for storage in the intent data repository 604. The parsing server 608 transmits the accepted subset of the set of intents to the intent data repository 604 for storage thereat. In some cases, the user of the reviewing user device 602 rejects some of the proposed intents. For example, an intent may be rejected if a header or a menu item on the webpage 612 does not correspond to an intent with which users are expected to access the contact center. In some cases, duplicate or redundant intents may be rejected. For example, a webpage may include a header or a menu item associated with a blog or a partner organization, and that blog or partner organization might not represent an intent with which users are expected to access the contact center. The user of the reviewing user device 602 may modify some of the proposed intents, for example, to rename some of the intents that were automatically generated using the webpage 612 and/or to add additional intents.

In some cases, in addition to performing the technique described above, the parsing server 608 may access, from the intent data repository 604, global intents for all entities (e.g., "open account," "close account") and industry-specific intents for specific industries (e.g., "make dining reservation" for the restaurant industry or "change seat" for the airline industry). The industry for which the industry specific intents are to be provided may be identified in response to prompting the user of the reviewing user device 602 to specify the industry. The global intents and/or the industry specific intents may be provided for review (e.g., acceptance, rejection, or modification) to the reviewing user device 602 in conjunction with the intents identified by the parsing server 608.

Figure 7:
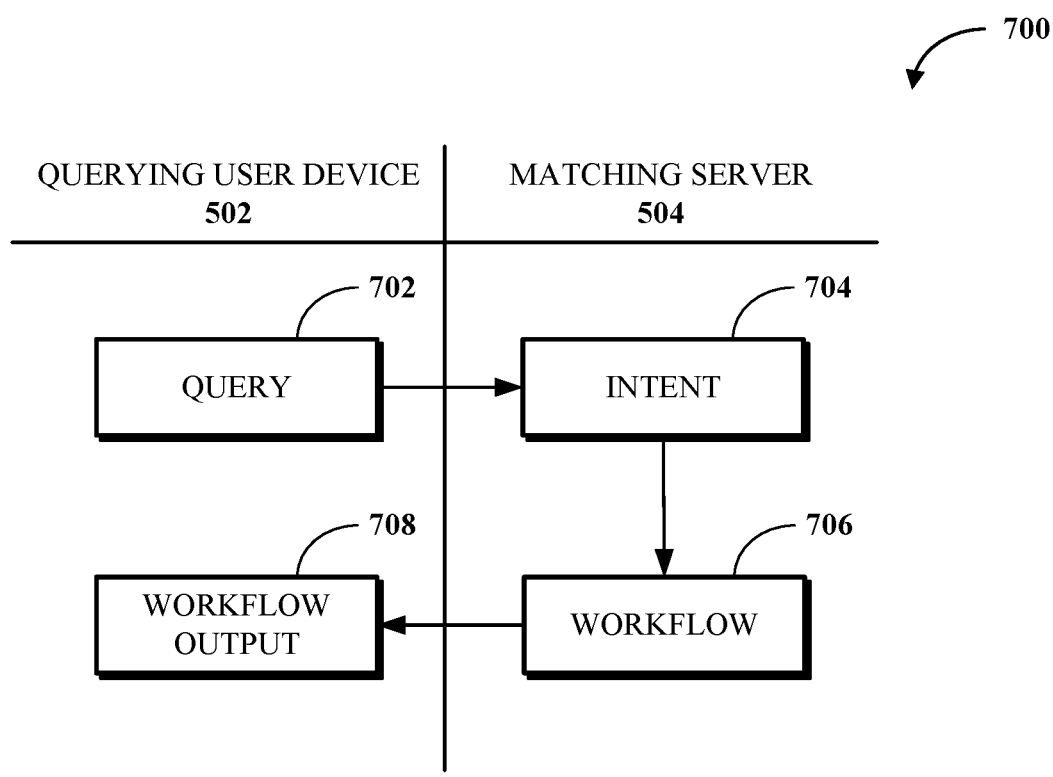
FIG. 7 is a data flow diagram of an example of intent matching and workflow processing.

FIG. 7 is a data flow diagram of an example of intent matching and workflow processing 700. As shown, the intent matching and workflow processing 700 is implemented using the querying user device 502 and the matching server 504 described in conjunction with FIG. 5.

As shown in FIG. 7, the querying user device 502 generates a query 702 in a natural language and transmits the query 702 to the server 504. The query 702 may be generated during a communication with a chat bot of the server 504 via a telephone call, a messaging application, a website, or a dedicated application of an entity associated with the chat bot. For example, a user might wish to open a savings account at a bank. To accomplish this, the user might telephone the bank and may be asked, by a chat bot, "Please state the reason for your call." In response, the user might say, "I want to open a new savings account," and that phrase may become the query.

The server 504 matches the query 702 to an intent 704 using the intent matching engine 508 shown in FIG. 5. The intent 704 may be identified by applying a CNN or other artificial intelligence software of the intent matching engine 508 to the query 702. For example, the query 702 "I want to open a new savings account," may match to the intent "open account." The server 504 identifies a workflow 706 corresponding to the intent 704. The workflow 706 may include, for example, a link to a webpage for opening new accounts with the bank or connection with a human representative who can assist the user of the querying user device 502 with opening the new account. In some cases, the workflow 706 may be performed by the chat bot of the server 504 directly. For example, to open the new account, the workflow 706 may include the chat bot verifying the user's identity (e.g., by having the user provide their social security number and answer security questions generated based on their credit report), verifying the type of account (e.g., savings account) that the user wishes to open, requesting the account number of another account from which the opening deposit is to be obtained, and initiating an automated clearing house (ACH) request for the opening deposit. The server 504 transmits a workflow output 708 associated with the workflow 706 (e.g., questions by the chat bot, the link to the webpage, or the connection with the human representative) to the querying user device 502.

Figure 8:
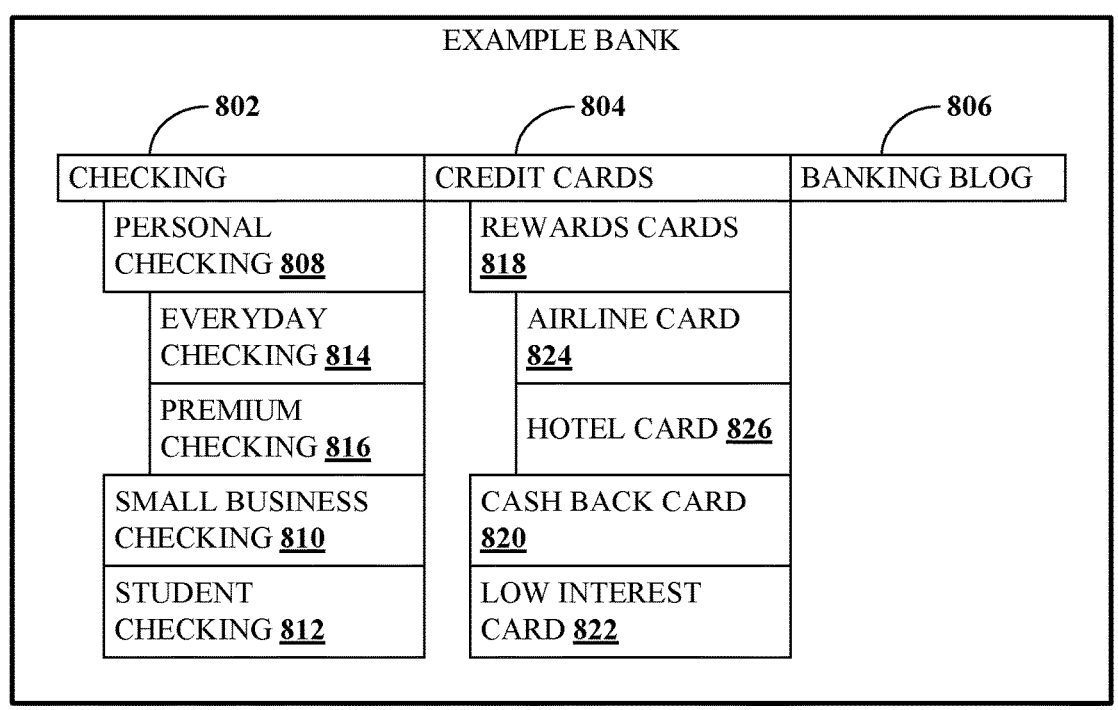
FIG. 8 illustrates an example online page including a menu.

FIG. 8 illustrates an example online page 800 including a menu. The online page 800 may correspond to the webpage 612 and may be stored at the web server 606 for display at client devices (e.g., the clients 104A-D). As shown, the online page 800 is for an entity called Example Bank, and so example intents as will be discussed with respect to the online page 800 are for a banking entity. The menu includes a checking submenu header 802, a credit cards submenu header 804, and a banking blog header 806. When the checking submenu header 802 or the credit cards submenu header 804 is selected, additional menu items may appear, as described below. The banking blog header 806 may correspond to a hyperlink to another page.

In some implementations, when the online page 800 is opened, only the checking submenu header 802, the credit cards submenu header 804, and the banking blog header 806 are shown. When the checking submenu header 802 is selected, a personal checking menu item 808, a small business checking menu item 810, and a student checking menu item 812 appear. When the personal checking menu item 808 is selected, an everyday checking menu item 814 and a premium checking menu item 816 appear. When one of the small business checking menu item 810, the student checking menu item 812, the everyday checking menu item 814, or the premium checking menu item 816 is selected, a page describing the relevant account opens.

When the credit cards submenu header 804 is selected, a rewards cards menu item 818, a cash back card menu item 820, and a low interest card menu item 822 appear. When the rewards card menu item 818 is selected, an airline card menu item 824 and a hotel card menu item 826 appear. When one of the cash back card menu item 820, the low interest card menu item 822, the airline card menu item 824, or the hotel card menu item 826 is selected, a page describing the relevant account opens.

In one example use case, the parser 614 accesses the online page 800 to identify intents associated with Example Bank for storage in the intent data repository 604. The parser 614 detects (e.g., based on hypertext markup language (HTML) code (or other code) of the online page 800) the checking submenu header 802, the credit cards submenu header 804, and the banking blog header 806. The parser 614 determines that "checking," "credit cards," and "banking blog" correspond to top-level intents. Based on items in the submenu below the checking submenu header 802, the parser 614 identifies "personal checking," (corresponding to the personal checking menu item 808) "small business checking," (corresponding to the small business checking menu item 810) and "student checking" (corresponding to the student checking menu item 812) as sub-intents of "checking." Furthermore, the parser 614 determines that "everyday checking," (corresponding to the everyday checking menu item 814) and "premium checking" (corresponding to the premium checking 816 menu item) are sub-intents of the "personal checking" sub-intent. Similarly, for the "credit cards" intent, the sub-intents are "rewards cards," "cash back card," and "low interest card." The "rewards cards" intent has the sub-intents "airline card" and "hotel card."

To identify sub-intents for the "banking blog" top-level intent, the parser 614 accesses the hyperlink associated with the banking blog header 806 and parses the associated page (e.g., using the same technique as for the online page 800). In one example, the hyperlink leads to another page which includes the headers (e.g., corresponding to blog post): "Innovation in Banking," "Example Bank Supports Minority-Owned Businesses," and "How to Finance a Car Purchase." Based on these headers, the parser may identify the sub-intents of "banking blog" of: "Innovation in Banking," "Example Bank Supports Minority-Owned Businesses," and "How to Finance a Car Purchase."

After generating the set of intents (including the top-level intents and the sub-intents) specified above, the parsing server 608 transmits the generated set of intents to the reviewing user device 602. At the reviewing user device 602, a reviewing user associated with Example Bank (e.g., an employee of Example Bank) reviews the generated intents and specified (e.g., via a graphical user interface) which intents are valid and which intents are not valid. For example, the reviewing user may specify that "banking blog" is not a valid intent because users do not typically access the contact center with the intents related to "banking blog." Also, the reviewing user may specify that the sub-intents of "banking blog" of "Innovation in Banking" and "Example Bank Supports Minority-Owned Businesses" are not valid intents. The reviewing user may specify that "How to Finance a Car Purchase" corresponds to a valid intent. This may occur, for example, because Example Bank has a vehicle financing division that was not included on the online page 800.

The reviewing user may rename the "How to Finance a Car Purchase" intent to "vehicle loans," and specify sub-intents for "vehicle loans" including: "new vehicle loan," "used vehicle loan," and "vehicle loan refinancing." To do this, the reviewing user may select the "How to Finance a Car Purchase" intent, select a "rename" button for renaming the intent, and select a "add sub-intent button" to add each sub-intent. Upon selection of the add sub-intent button, the reviewing user may be prompted to type a name for each sub-intent they wish to add.

The reviewing user may confirm that "checking," "credit cards" and all of their sub-intents are valid. In one example, the reviewing user is presented with a list of all of the generated intents and is able to select, via the graphical user interface of the reviewing user device 602, a checkbox next to each valid intent. To indicate that an intent (e.g., "banking blog") is not valid, the user foregoes selecting the associated checkbox. In some cases, the reviewing user is able to rename the intents, (e.g., the intent "checking" may be renamed to "open checking account") for example, by selecting one of the generated intents and pressing an "edit"

button on the graphical user interface of the reviewing user device. The intents that are identified by the reviewing user as valid may be stored in the intent data repository 604 for processing by the intent matching engine 508 when a query is to be matched to an intent.

In one example use case, a user of a client device (e.g., a prospective or existing customer of Example Bank) accesses the contact center of Example Bank and speaks, "I want to open an airline rewards credit card," in response to a prompt for a query. This query may be matched, by the intent matching engine 508, to the intent "airline card" because the user specified that they are interested in the airline card.

In another example use case, a user of a client device accesses the contact center of Example Bank and types, "Open new checking account," in response to a prompt for a query. The intent matching engine 508 matches this query to "checking," and may offer, via the client device, additional prompts to assign the query to one of the sub-intents. For example, the user may be prompted, via the client device, to specify whether they are interested in personal checking, small business checking, or student checking. If the user is interested in personal checking, the user may be prompted, via the client device, to specify whether they are interested in everyday checking or premium checking. The prompt may include a description of the differences between the everyday checking and the premium checking accounts (e.g., "The everyday checking account has a monthly fee of $3 which is waived with a $100 balance, while the premium checking account has a monthly fee of $20 which is waived with a $5000 balance.")

Figure 9:
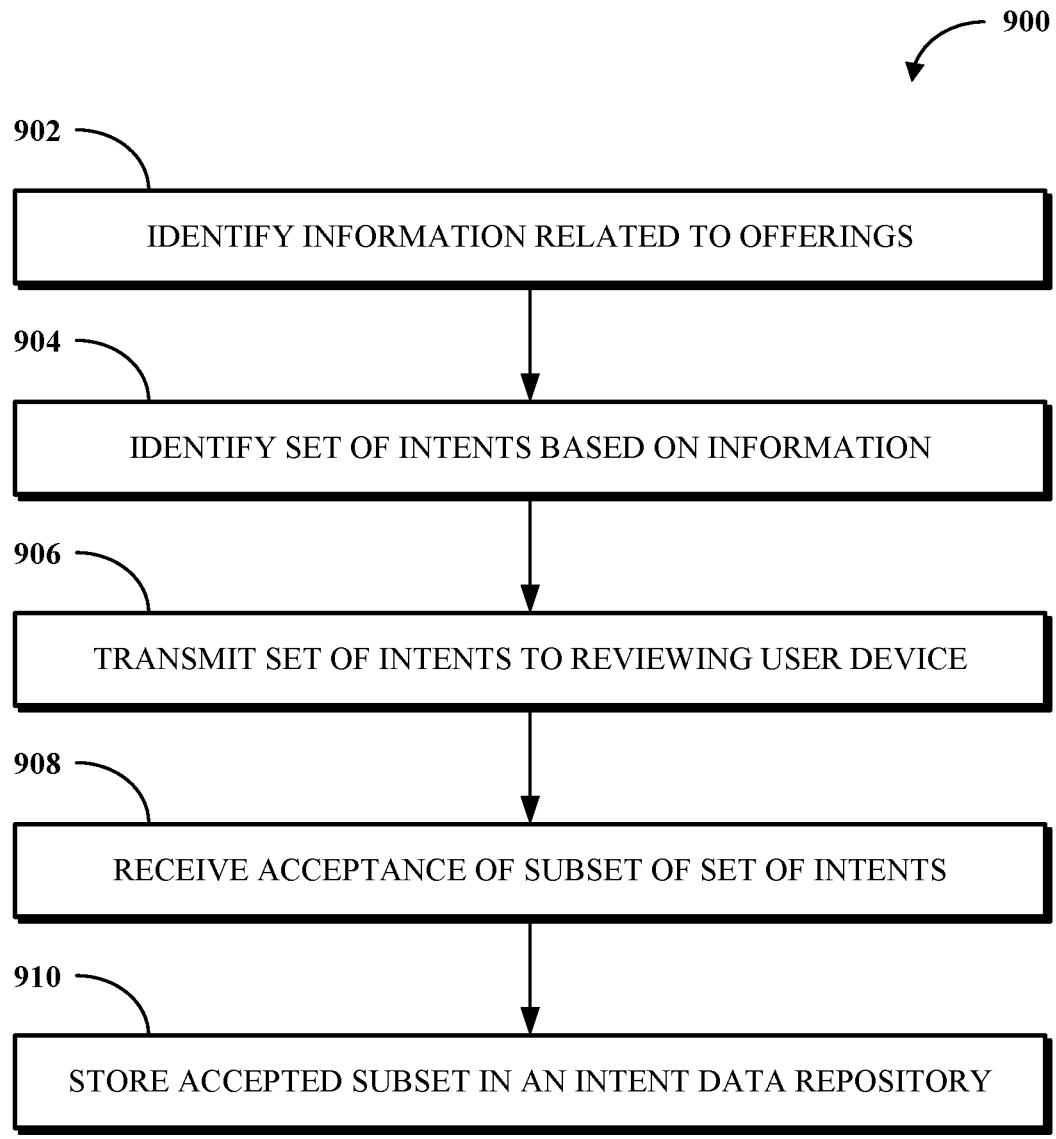
FIG. 9 is a flowchart of an example of a technique for intent identification.

To further describe some implementations in greater detail, reference is next made to examples of techniques for intent identification. FIG. 9 is a flowchart of an example of a technique 900 for intent identification. The technique 900 can be executed using computing devices, such as the systems, hardware, and software described with respect to FIGS. 1-8. The technique 900 can be performed, for example, by executing a machine-readable program or other computer-executable instructions, such as routines, instructions, programs, or other code. The steps, or operations, of the technique 900 or another technique, method, process, or algorithm described in connection with the implementations disclosed herein can be implemented directly in hardware, firmware, software executed by hardware, circuitry, or a combination thereof.

For simplicity of explanation, the technique 900 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

The technique 900 is described below as processing an online page. However, other types of pages could be used in addition to or in place of the online page. For example, a header, a table of contents item, or a menu item from a brochure, a pamphlet or a product user manual associated with an entity for which a contact center system is operated may correspond to an intent. The online page may be replaced with one or more pages from a brochure, a pamphlet, a product user manual, a restaurant dining menu, or any other literature associated with the contact center system. In some cases, these pages may be scanned and have optical character recognition (OCR) applied to them prior to processing as described above.

At 902, a server (e.g., the parsing server 608) identifies, by parsing through code of an online page (e.g., the webpage 612 or the online page 800) associated with a contact center system (e.g., the contact center 400), information related to offerings associated with the online page. The information may include headers of the online page or a menu (e.g., including menu items) of the online page.

Prior to accessing the online page, the server may access a bot instruction file (e.g., robots.txt) for the online page. The server may determine, based on the bot instruction file, that automated access to all or a part of the online page is permitted. The server may access the part of the online page that the server is permitted to access by the bot instruction file.

Parsing through the code of the online page may be performed by a parser (e.g., the parser 614). The parser may be configured to identify the headers or the menu items of the online page, for example, based on HTML code (or other markup language code) of the online page.

At 904, the server identifies a set of intents based on the information. At least some of the intents in the set correspond to headers or menu items of the online page. In some implementations, the server updates the set of intents based on supplemental information accessible by a hyperlink from the online page. The supplemental information may reside on an additional online page accessible by the hyperlink. The supplemental information may reside on the online page, and/or may correspond to headers or menu items of the additional online page. In alternative implementations where a document different from an online page is used, the set of intents may correspond to headers (e.g., identified based on larger text or bold text) of sections of the document and/or items listed in a table of contents of the document. For example, a scanned restaurant dining menu may include sections for "breakfast," "lunch," and "dinner," with the words "breakfast," "lunch," and "dinner" in large and bold text, followed by food items for each meal in smaller text. Based on the words "breakfast," "lunch," and "dinner" being in large and bold text, the server may determine that "breakfast," "lunch," and "dinner" correspond to intents.

At 906, the server transmits (e.g., via a network, such as the network 610) the updated set of intents to a first user device (e.g., the reviewing user device 602). The first user device may be operated by a user responsible for reviewing intents associated with the contact center system. For example, the first user device may be an administrator user device of the contact center system.

At 908, the server receives (e.g., via the network) an acceptance of a subset of the updated set of intents from the first user device. The acceptance may be useful because some headers and/or menu items might not correspond to valid intents. For example, as shown in FIG. 8, and described above, the banking blog header 806 might not be a valid intent. In some cases, the user of the first user device may reject a proposed intent because the proposed intent is not a valid intent associated with the entity using the contact center. For example, as described above, "banking blog" may be a header or a menu item on a bank's webpage, but might not correspond to an intent associated with the bank. In some cases, a user may propose modifications to the set of intents generated by the server, for example, by adding new intents or renaming intents generated by the server. In the banking example of FIG. 8, the user of the first user device may wish to add other intents (e.g., "savings account") which are not shown on the webpage. Alternatively, the user may wish to rename certain intents. For example, if the airline credit card (corresponding to Airline Card 824) is associated with ABC Airlines, the user may rename the "airline card" intent to "ABC Airlines card."

At 910, the server stores, in an intent data repository (e.g., the intent data repository 604), the accepted subset of the updated set of intents. The intent data repository stores intents to which queries are to be matched (e.g., as shown in FIG. 7) by the contact center system (e.g., using the matching server 504). The queries may be received during a contact center engagement between an end-user and a computer-implemented agent. In some implementations, the server transmits the accepted subset of the set of intents to a second user device (e.g., operated by a programmer of the contact center system). The server receives a workflow (or a response template that is different from a workflow) for at least one intent from the accepted subset from the second user device. The workflow may be implemented in response to matching the intent to a query.

It should be noted that additional intents may be added to the intents generated using the technique 900. For example, additional intents may be based on intents used by other entities in the industry. For instance, in the banking example discussed in conjunction with FIG. 8, users may access a contact center of a bank (either the bank associated with the online page 800 or a different bank) to determine their account balance or to dispute a transaction. However, "check account balance" or "dispute transaction" is not included on the menu of the online page 800 of the bank. These intents may be added to the intent data repository 604 manually by the user of the reviewing user device 602 or based on a server reviewing intents associated with other banks and getting acceptance of those intents from the user of the reviewing user device 602.

In one example use case, a restaurant's webpage has a header for "dining menu," "delivery," and "takeout." These could correspond to intents for a contact center of the restaurant using the technique described herein. After identifying these intents, the server may determine, based on intents associated with other restaurants, that "make dining reservation" could also be in intent for the restaurant. This intent may be transmitted for acceptance to the reviewing user device 602. Alternatively, the user of the reviewing user device 602 could manually create a "make dining reservation" intent.

Some implementations are described below as numbered examples (Example 1, 2, 3, etc.). These examples are provided as examples only and do not limit the other implementations disclosed herein.

Example 1 is a method, comprising: identifying, by parsing through code of an online page associated with an entity for which a contact center system is operated, information related to offerings associated with the online page; identifying a set of intents based on the information, at least a portion of the set of intents corresponding to headers or menu items of the online page; updating the set of intents based on supplemental information accessible by a hyperlink from the online page; transmitting, via a network, the updated set of intents to a first user device; receiving, via the network, an acceptance of a subset of the updated set of intents from the first user device; and storing, in an intent data repository, the accepted subset of the updated set of intents, wherein the intent data repository stores intents to which queries are to be matched by the contact center system, the queries being received during a contact center engagement between an end-user and a computer-implemented agent.

In Example 2, the subject matter of Example 1 includes, transmitting the accepted subset of the updated set of intents to a second user device; and receiving a workflow for at least one intent from the accepted subset from the second user device.

In Example 3, the subject matter of Examples 1-2 includes, determining, based on a bot instruction file for the online page, that automated access to at least a part of the online page is permitted.

In Example 4, the subject matter of Examples 1-3 includes, the information comprising a menu of the online page or the headers of the online page.

In Example 5, the subject matter of Examples 1-4 includes, parsing through the code being performed using a parser configured to identify the headers or the menu items of the online page.

In Example 6, the subject matter of Examples 1-5 includes, the code comprising hypertext markup language (HTML) code.

In Example 7, the subject matter of Examples 1-6 includes, the supplemental information residing on an additional online page.

Example 8 is a non-transitory computer readable medium storing instructions operable to cause one or more processors to perform operations comprising: identifying, by parsing through code of an online page associated with an entity for which a contact center system is operated, information related to offerings associated with the online page; identifying a set of intents based on the information, at least a portion of the set of intents corresponding to headers or menu items of the online page; updating the set of intents based on supplemental information accessible by a hyperlink from the online page; transmitting, via a network, the updated set of intents to a first user device; receiving, via the network, an acceptance of a subset of the updated set of intents from the first user device; and storing, in an intent data repository, the accepted subset of the updated set of intents, wherein the intent data repository stores intents to which queries are to be matched by the contact center system, the queries being received during a contact center engagement between an end-user and a computer-implemented agent.

In Example 9, the subject matter of Example 8 includes, the operations comprising: transmitting the accepted subset of the updated set of intents to a second user device; and receiving workflows for intents from the accepted subset from the second user device.

In Example 10, the subject matter of Examples 8-9 includes, the operations comprising: determining, based on a bot instruction file for the online page, that automated access to the online page is permitted.

In Example 11, the subject matter of Examples 8-10 includes, the information comprising a menu of the online page.

In Example 12, the subject matter of Examples 8-11 includes, parsing through the code being performed using a parser configured to identify the menu items of the online page.

In Example 13, the subject matter of Examples 8-12 includes, the code being in a markup language.

In Example 14, the subject matter of Examples 8-13 includes, the supplemental information residing on an additional online page and corresponding to headers or menu items of the additional online page.

Example 15 is an apparatus comprising: a memory; and a processor configured to execute instructions stored in the memory to: identify, by parsing through code of an online page associated with an entity for which a contact center system is operated, information related to offerings associated with the online page; identify a set of intents based on the information, at least a portion of the set of intents corresponding to headers or menu items of the online page; update the set of intents based on supplemental information accessible by a hyperlink from the online page; transmit, via a network, the updated set of intents to a first user device; receiving, via the network, an acceptance of a subset of the updated set of intents from the first user device; and store, in an intent data repository, the accepted subset of the updated set of intents, wherein the intent data repository stores intents to which queries are to be matched by the contact center system, the queries being received during a contact center engagement between an end-user and a computer-implemented agent.

In Example 16, the subject matter of Example 15 includes, the processor configured to execute instructions stored in the memory to: transmit the accepted subset of the updated set of intents to a second user device; and receive a response template for at least one intent from the accepted subset from the second user device.

In Example 17, the subject matter of Examples 15-16 includes, the processor configured to execute instructions stored in the memory to: determine, based on an instruction file associated with the online page, that automated access to the online page is permitted.

In Example 18, the subject matter of Examples 15-17 includes, the information comprising the headers of the online page.

In Example 19, the subject matter of Examples 15-18 includes, parsing through the code being performed using a parser configured to identify the headers of the online page.

In Example 20, the subject matter of Examples 15-19 includes, the supplemental information corresponding to headers or menu items of an additional online page.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
   identifying, by parsing through code of an online page associated with an entity for which a contact center system is operated, information related to offerings associated with the online page;
   identifying a set of intents based on the information, at least a portion of the set of intents corresponding to headers or menu items of the online page;
   updating the set of intents based on supplemental information accessible by a hyperlink from the online page;
   transmitting, via a network, the updated set of intents to a first user device;
   receiving, via the network, an acceptance of a subset of the updated set of intents from the first user device; and
   storing, in an intent data repository, the accepted subset of the updated set of intents, wherein the intent data repository stores intents to which queries are to be matched by the contact center system, the queries being received during a contact center engagement between an end-user and a computer-implemented agent.

2. The method of claim 1, comprising:
transmitting the accepted subset of the updated set of intents to a second user device; and
receiving a workflow for at least one intent from the accepted subset from the second user device.

3. The method of claim 1, comprising:
determining, based on a bot instruction file for the online page, that automated access to at least a part of the online page is permitted.

4. The method of claim 1, the information comprising a menu of the online page or the headers of the online page.

5. The method of claim 1, parsing through the code being performed using a parser configured to identify the headers or the menu items of the online page.

6. The method of claim 1, the code comprising hypertext markup language (HTML) code.

7. The method of claim 1, the supplemental information residing on an additional online page.

8. A non-transitory computer readable medium storing instructions operable to cause one or more processors to perform operations comprising:
identifying, by parsing through code of an online page associated with an entity for which a contact center system is operated, information related to offerings associated with the online page;
identifying a set of intents based on the information, at least a portion of the set of intents corresponding to headers or menu items of the online page;
updating the set of intents based on supplemental information accessible by a hyperlink from the online page;
transmitting, via a network, the updated set of intents to a first user device;
receiving, via the network, an acceptance of a subset of the updated set of intents from the first user device; and
storing, in an intent data repository, the accepted subset of the updated set of intents, wherein the intent data repository stores intents to which queries are to be matched by the contact center system, the queries being received during a contact center engagement between an end-user and a computer-implemented agent.

9. The computer readable medium of claim 8, the operations comprising:
transmitting the accepted subset of the updated set of intents to a second user device; and
receiving workflows for intents from the accepted subset from the second user device.

10. The computer readable medium of claim 8, the operations comprising:
determining, based on a bot instruction file for the online page, that automated access to the online page is permitted.

11. The computer readable medium of claim 8, the information comprising a menu of the online page.

12. The computer readable medium of claim 8, parsing through the code being performed using a parser configured to identify the menu items of the online page.

13. The computer readable medium of claim 8, the code being in a markup language.

14. The computer readable medium of claim 8, the supplemental information residing on an additional online page and corresponding to headers or menu items of the additional online page.

15. An apparatus comprising:
a memory; and
a processor configured to execute instructions stored in the memory to:
identify, by parsing through code of an online page associated with an entity for which a contact center system is operated, information related to offerings associated with the online page;
identify a set of intents based on the information, at least a portion of the set of intents corresponding to headers or menu items of the online page;
update the set of intents based on supplemental information accessible by a hyperlink from the online page;
transmit, via a network, the updated set of intents to a first user device;
receiving, via the network, an acceptance of a subset of the updated set of intents from the first user device; and
store, in an intent data repository, the accepted subset of the updated set of intents, wherein the intent data repository stores intents to which queries are to be matched by the contact center system, the queries being received during a contact center engagement between an end-user and a computer-implemented agent.

16. The apparatus of claim 15, the processor configured to execute instructions stored in the memory to:
transmit the accepted subset of the updated set of intents to a second user device; and
receive a response template for at least one intent from the accepted subset from the second user device.

17. The apparatus of claim 15, the processor configured to execute instructions stored in the memory to:
determine, based on an instruction file associated with the online page, that automated access to the online page is permitted.

18. The apparatus of claim 15, the information comprising the headers of the online page.

19. The apparatus of claim 15, parsing through the code being performed using a parser configured to identify the headers of the online page.

20. The apparatus of claim 15, the supplemental information corresponding to headers or menu items of an additional online page.

* * * * *